W. H. H. HOLLEN.
ROTARY KNITTING-MACHINES.

No. 183,169.  Patented Oct. 10, 1876.

Witnesses

Inventor
Wm H. H. Hollen
By Daniel Breed Atty

W. H. H. HOLLEN.
ROTARY KNITTING-MACHINES.
No. 183,169. Patented Oct. 10, 1876.
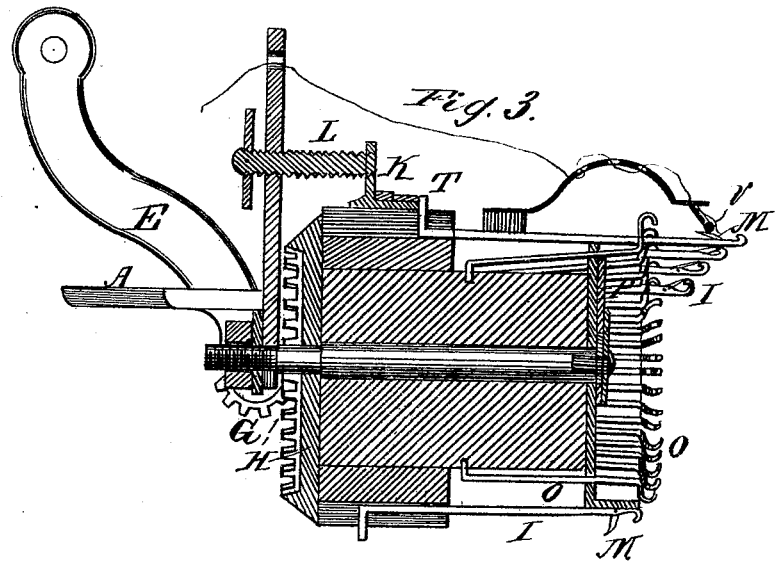
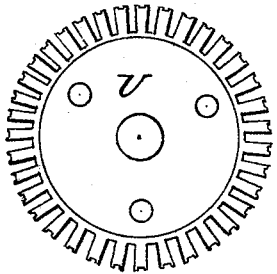
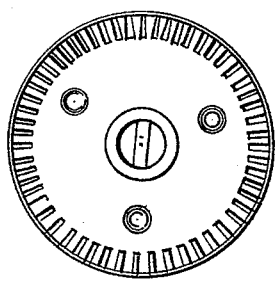
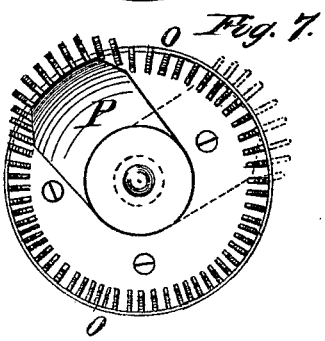
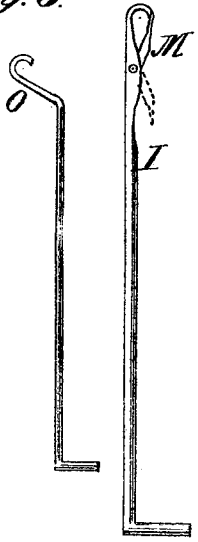
Witnesses
Fred. G. Dieterich
S. S. Kirk
Inventor
Wm H. H. Hollen
By Daniel Breed Atty
JAMES R. OSGOOD & CO. BOSTON.

3 Sheets—Sheet 3.
W. H. H. HOLLEN.
ROTARY KNITTING-MACHINES.
No. 183,169. Patented Oct. 10, 1876.
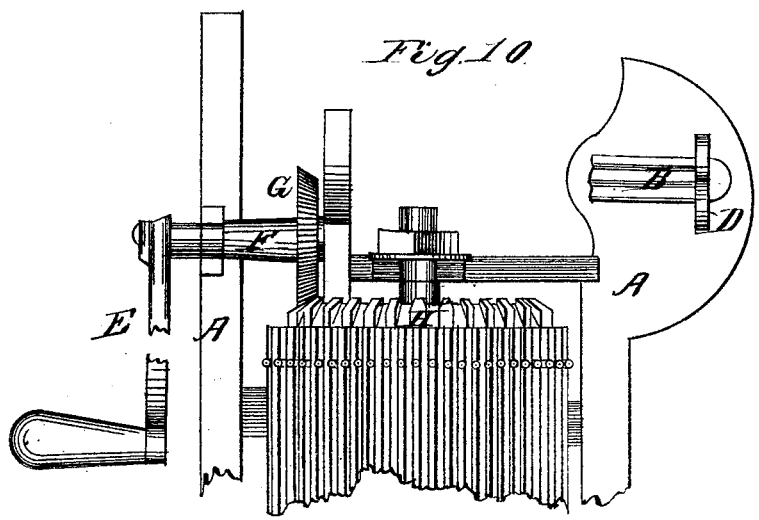
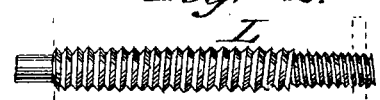
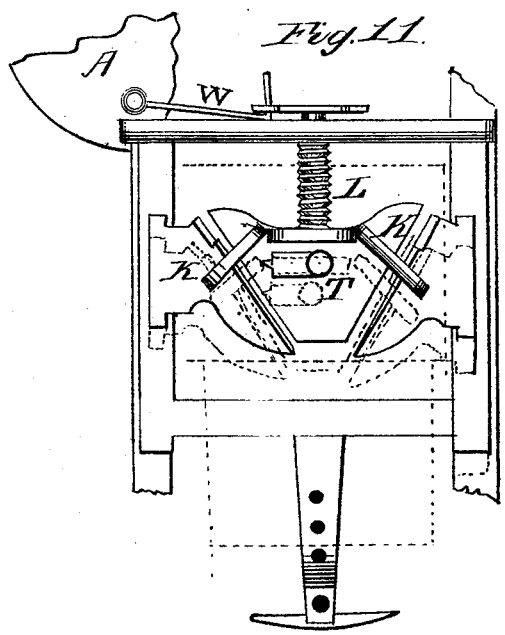
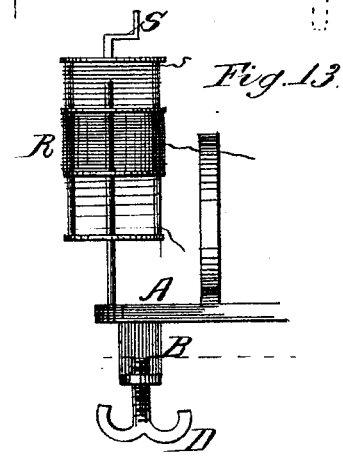
Witnesses
Inventor
Wm H. H. Hollen
By Daniel Breed Atty

UNITED STATES PATENT OFFICE

WILLIAM H. H. HOLLEN, OF FOSTORIA, PENNSYLVANIA, ASSIGNOR OF ONE-HALF OF HIS RIGHT TO SUMNER S. KIRK, OF WASHINGTON, DISTRICT OF COLUMBIA.

IMPROVEMENT IN ROTARY KNITTING-MACHINES.

Specification forming part of Letters Patent No. 183,169, dated October 10, 1876; application filed May 19, 1876.

*To all whom it may concern:*

Be it known that I, WILLIAM H. H. HOLLEN, of Fostoria, in the county of Blair and State of Pennsylvania, have invented certain new and useful Improvements in Rotary Knitting-Machines; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to an improvement in cylindrical knitting-machines, intended more especially for family use; and it consists in the arrangement and combination of devices which will be fully described in the following specification, and by means of which devices I have simplified both the machine and the mode of knitting, and thus effected great economy in the manufacture of the knitting-machine, and in the labor of knitting.

The accompanying drawings represent my improved knitting-machine.

Figure 1:
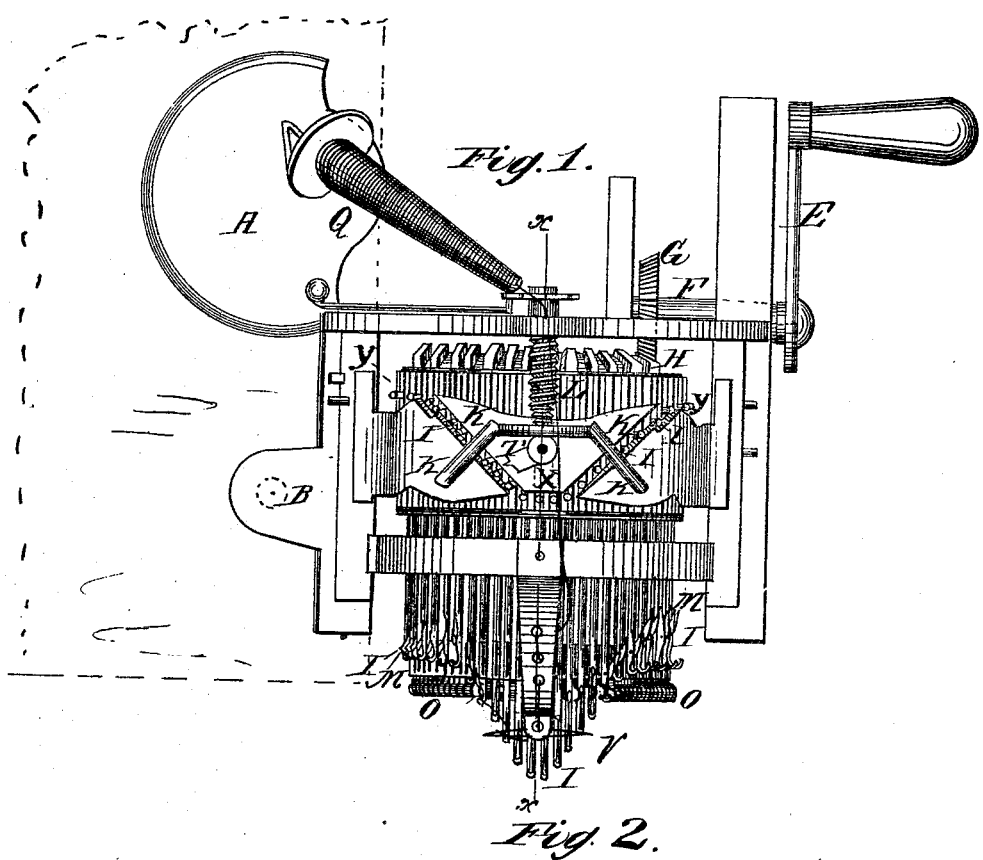
Figure 2:
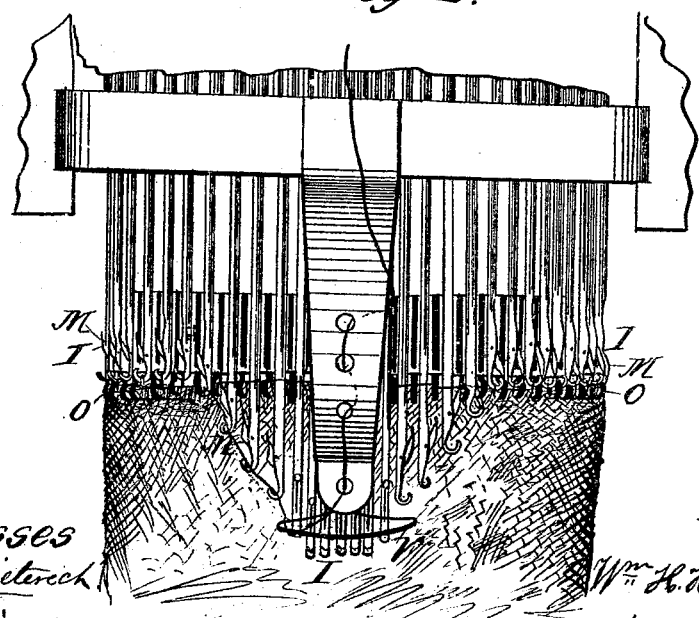

Figure 1 is a top view of the machine. Fig. 2 is a detached view of the needles, showing also the form of the stitches. Fig. 3 is a section on the line $x\,x$ of Fig. 1. Figs. 4, 5, and 6 are detached views of the slotted plate, fastened to the forward end of the cylinder, showing the slots for the hooks and the notches for the needles to work in. Fig. 7 is also a front view of the same plate, with the spring-hooks in place, and some of the hooks raised by the cam P, as will be more fully explained hereafter. Fig. 8 is a hook detached from the machine; Fig. 9, the needle, also detached. Fig. 10 shows the gearing. Fig. 11 represents the cam which moves the needles. Fig. 12 is the right and left hand screw for adjusting the cam K. Fig. 13 is a detached view of the reel in three divisions.

In the construction of my knitting-machine I make a suitable frame, A, provided with clamps B and thumb-screws D, for fastening the machine to the edge of a table in the usual manner. The horizontal shaft F carries a bevel-gear wheel, G, which engages with the bevel-gear on the end of the cylinder H, as seen in Fig. 1. By this arrangement the crank E gives motion to the machine. On the end of the cylinder H is a circular plate, U, Figs. 4 and 5, having slits in its edge for guiding the spring-hooks O, and small notches for the needles I. These spring-hooks are set in wood, and all draw the cloth toward the center of the cylinder or circle of needles, thus forming a novel feature in knitting-machines.

Another important feature is the pushing of each needle successively forward out of rank to receive the yarn or thread, and then drawing the needle and yarn back into rank while forming the new stitch. This motion of the needles is produced by the slotted cam K, in which the shank of the needle works or travels as the cylinder of needles revolves. This cam is open both in front and rear, and at these open spaces X Y, Fig. 1, the needles may be thrown out of work when desired. This cam is made adjustable by means of the right and left hand screw L, in order to push the needles forward more or less, and thus make the stitches longer or shorter, as desired. This screw, after being turned to adjust the cam, is fixed in place by means of the wire detent W, as seen in Fig. 11. After the needles are pushed forward each one in succession seizes the thread from the thread-guide V, as seen in Fig. 2, and then, as the needle retires, the new stitch is completed.

A cam, P, is arranged to lift the hooks O, so that the new stitch may be drawn into or under the hook by the receding needle, the body or stem of the spring holding the cloth back out of the way while the new stitch is being formed.

When the stitch is completed, and the hook has passed the cam P, it again draws the cloth in the direction of the center of the cylinder, away from the points of the needles.

I thus have a flexible or spring guard for each needle, instead of the unwieldly weight hitherto in use for the purpose.

The spool of yarn may be set in the usual manner, as seen at Q, Fig. 1. But I prefer to use a small reel, as seen at R, Fig. 13. This reel has three or more divisions, upon which different colored yarns may be wound separately. The reel is provided with a crank, S, for winding the yarn, and the several colors may be wound upon the reel at the same time, thus avoiding the labor of winding many spools.

In order to commence knitting with my machine, the first stitch is looped by hand upon each of the needles in regular order, using all the needles for a circular web, and part of them, more or less, for a narrower web. In case I wish to use only a part of the needles, the others are pushed back out of the reach of the cam K. Now, by turning the crank E, the knitting proceeds in the usual manner.

For the purpose of widening the work in a narrow web, more needles are pushed forward to take up the work; and for narrowing the web the needles are successively pushed back, as desired.

In knitting hosiery, when the leg is completed, and come to knit the heel, one-half of the circle of needles are pushed back, so as to escape the cam K, as above explained; and then I knit backward and forward by reversing the crank motion, as in a narrow web.

In this reverse motion, if I wish to narrow the web one stitch at every reverse, I employ the tumbler T, which, at the commencement, is set by hand, so as to catch the first needle, after which the tumbler operates automatically, throwing one needle out of work at each reverse motion.

Having described my invention, I claim—

1. In combination with a needle-cylinder or needle-bar and the needles, the spring-hooks O, and a cam for operating the same, substantially as and for the purposes set forth.

2. The cam K, having open spaces X Y in front and rear, and the right and left hand screw L, in combination with the detent W, substantially as and for the purposes specified.

In testimony that I claim the foregoing as my own I affix my signature in presence of two witnesses.

WILLIAM H. H. HOLLEN.

Witnesses:
   D. W. HOWARD,
   M. L. HOWSON.